United States Patent [19]

Samowich

[11] 4,409,275
[45] Oct. 11, 1983

[54] DECORATIVE LAMINATE

[76] Inventor: Joseph J. Samowich, 33 Greenwich Ave., New York, N.Y. 10014

[21] Appl. No.: 356,656

[22] Filed: Mar. 10, 1982

Related U.S. Application Data

[63] Continuation-in-part of Ser. No. 537,445, Dec. 30, 1974, Pat. No. 4,329,386.

[51] Int. Cl.³ .......................... B32B 3/10; B32B 5/20; B32B 5/22
[52] U.S. Cl. ................... 428/138; 428/314.2; 428/317.5; 428/317.9; 428/907
[58] Field of Search ............. 428/314.2, 317.9, 319.1, 428/907, 921, 137, 138, 196, 318.6, 317.5

[56] References Cited

U.S. PATENT DOCUMENTS

| Re. 28,682 | 1/1976 | Hoey | 428/314.2 |
| 3,547,688 | 12/1970 | Gagliardi et al. | 428/907 |
| 3,551,192 | 12/1970 | Reinert | 428/907 |
| 3,607,341 | 9/1971 | Goins | 428/314.2 |
| 3,891,487 | 6/1975 | Hoey | 428/314.2 |
| 3,901,240 | 8/1975 | Hoey | 428/314.2 |
| 4,055,699 | 10/1977 | Hsiung | 428/304.4 |
| 4,223,066 | 9/1980 | Boyle | 428/921 |

Primary Examiner—William J. Van Balen
Attorney, Agent, or Firm—Nolte and Nolte

[57] ABSTRACT

A decorative laminate comprising a substrate, a foam adhered thereto and a top layer of clear film with a decoration encapsulated between the foam and the film, together with a method for manufacturing said laminate. Additives in the nature of fire retardants are added to the foam and film and insulators incorporated in the substrate. The film may be imperforate or perforated so that the laminate is breathable.

27 Claims, 4 Drawing Figures

DECORATIVE LAMINATE

This application is a continuation-in-part of copending application Ser. No. 537,445 filed Dec. 30, 1974 now U.S. Pat. No. 4,329,386.

This invention concerns improvements in laminates, particularly in decorative laminates and processes for their manufacture.

As disclosed in my original application, the basic laminate of the invention includes a substrate, a foam that adheres thereto, a top layer of a clear film and preferably a decoration which is encapsulated between the foam and the film. Preferably, the substrate is a textile fabric, the foam is a crushed thermoset self-adhering foam, the film is also a thermoset material capable of self-adhering to said foam and the decoration is printing or some other coloring, either in the film or on the side of the film adjacent the foam or on the foam. Preferably, the film and the foam are both acrylic polymers.

It has now been found that advantage may be taken of the barrier afforded by the film to encapsulate and thereby protect against aging, weather, moisture and the like, auxiliaries in the nature of fire retardants and insect repellents added to the foam. That is to say: at least one active compound is added to the foam, and by shielding the thus modified foam with an overlying film, barrier means are thereby constituted for substantially preventing ambient elements and the active compound from reacting.

Similar auxiliaries may be applied to the top surface of the film for immediate effect; and to, or woven with, the substrate for reinforcement of fire retardancy capabilities of the laminate.

Moreover, temperature insulators, absorbent or reflective, may be incorporated as, in or upon the substrate.

The entire laminate of the basic invention may be imperforate or breathable. In one embodiment of the invention, the film is perforated to permit active insect repellent, admixed with, or applied to, the foam layer, access to ambient so that it can react, while still comprising a substantial barrier to repellent/ambient reaction of all of the repellent at once.

Figure 3:
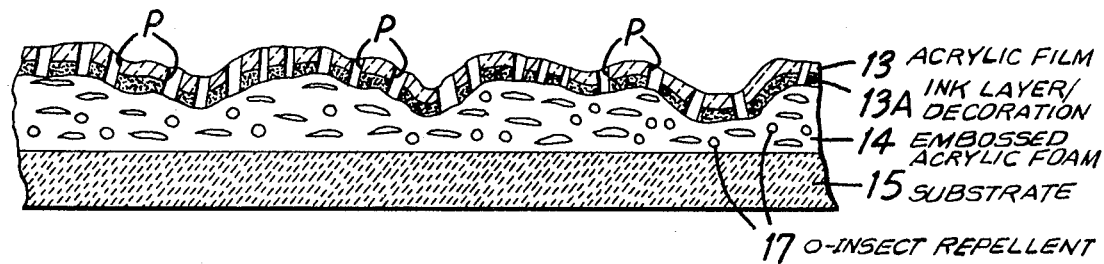
Figure 4:
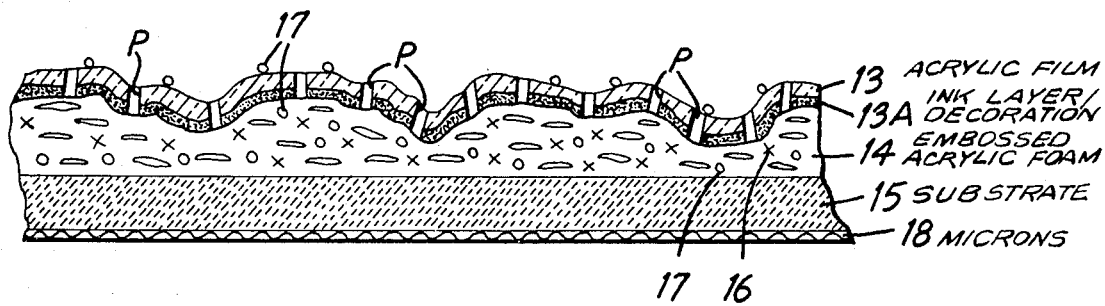

FIG. 3 similarly indicates a further arrangement of a modified product according to the invention and comprises the addition of an insect repellent in combination with the substrate fabric carried by the intermediate foam body; and FIG. 4 illustrates the application, as for example, by vacuum metalizing an insulator material, such as aluminum or copper microns, to the free side of the substrate fabric.

As disclosed in my prior application, the preferred embodiment of the decorative laminate is manufactured by casting a clear cross-linkable or thermosettable acrylic film on silicone-coated release paper. The film is dried without thermosetting and the decoration is printed on the dried clear film while it is still on the release paper. A similar cross-linkable acrylic polymer is foamed, applied to a substrate and dried without thermosetting to form a foam-backed fabric. The printed side of the clear film and the foamed side of the foam-backed fabric are then brought together, the foam is crushed and the film and foam are heated enough to cross-link the polymers.

Details of the manufacture of the foam-backed fabric are set forth in U.S. Pat. No. 3,607,341 to Goins and Morris, which is hereby incorporated by reference. As detailed in that patent, foam may be applied to all manner of substrates, including "textile fabrics of woven, knitted, felted or other construction, plastic films, fiberglass, paper and the like, as well as other flexible sheet material". It may also be applied to numerous rigid materials.

In my decorative laminate, I attach importance to the substrate. The substrate is the base, foundation or groundwork on which the foam will adhere. As noted, therefore, the substrate can be woven and non-woven textiles made of synthetic and non-synthetic natural fibers, as well as blends. They can be finished, non-finished, texturized, flocked, stretchable, knits, etc. The side opposite the film, foam, substrate can have a prefinished face consisting of flock, fake fur, aluminized mylar, etc., which results in two functional surfaces such as may be used for reversible coats, tablecloths, windowshades, covers, etc.

The substrate can be heavy, light, thick, thin, firm, soft, rigid, semi-rigid, and include various forms of paper, paperboard, and tissue; also, processed and unprocessed wood and wood products, primed and unprimed metals, other rigid and semi-rigid plastics and films, leather and leather substitutes, plywood, asbestos, building and fibre boards.

The importance of a substrate can be illustrated as follows: If a fire retardant foam, discussed, infra, is adhered to a woven fiberglass, and a clear film with a decoration (color or print) facing the foam is bonded and thermoset, the end result will be a fireproof fabric. A lit cigarette will not ignite this fabric, it will smolder and go out. The film keeps the smoke and smell to a minimum and, in any event, if there is further penetration, the heat or smoldering cigarette ceases to be of danger when it reaches the fiberglass layer. Fiberglass in itself does not burn. This product has good potential for mattress covers, furniture, window shades, aircraft and marine interiors, etc. It also has good acoustical and insulating properties for building purposes. In this connection, aluminum foil and vacuum aluminum, metalized polyester fabrics, mylar film, used in conjunction as a substrate with the foam/film, are excellent energy savers, keeping heat in, in the winter, and cold in, in the summer. In these specific, preferred embodiments, it should be mentioned that the film and the foam are prepared from acrylic polymers which are cross-linkable and thermosettable and self-bondable. In the case of window shades, roman shades and draperies, the aluminum substrate acts as the solar reflector, the acrylic film/foam and decorative layer act as the insulator and room furnishing.

By the same token, the aluminum used as a substrate in the form of a foil or vacuum metallized fabric, plus the fire retardant foam, decoration and film, accomplish the same fire protection as the fiberglass combination described. The only difference is that the metallic element, aluminum, is lighter, ductile and malleable, besides not being able to tarnish or oxidize. Its highly reflective qualities tend to also reject heat, especially flame, thus in certain cases being more desirable as substrate material.

The opposite effect is worth mentioning. Since copper is a very good conductor of heat, in this case it should be used as the substrate, in the metallized fabric, or film, or foil form, with a layer of acrylic foam which is pigmented black, color or print in between the acrylic flim, all self-bonded. Used as a drape, shade, etc. instead of rejecting solar heat, it conducts it into the black foam, heating and trapping the heat into a room, area, or body. The decorated film now adds ambiance to the room by hiding the black foam while still protecting the foam. If the film is left clear to show the black foam, this now produces a black-out drape minus the decoration. Because copper tends to oxidize and discolor, it is desirable to coat the copper with a thin layer of black coloring, which also increases heat conductivity.

Further, substrates comprising cotton fabric, for example, treated with the fire retardants, when combined with a fire retardant foam layer and film, also offer a degree of protection against the hazards of fire.

Any combination of substrates mentioned in this invention can be bonded to one another. Also, a substrate can be in the center, with foam/film composite on either side. Both sides can be different or same solid colors, one solid, one print, two prints, etc.

It should not be misconstrued that the examples cited are only for home furnishings. The systems can be applied for apparel, protective gear, interiors for aircraft, ships, railroad cars, automobiles, etc, including wall coverings.

The foam that is used is typically a polymerized latex emulsion with a water soluable surfactant that functions both as a foaming aid and a foaming stabilizer. Numerous examples of suitable emulsions and surfactants are set forth in the '341 patent and will not be detailed herein except to observe that acrylic emulsions are preferred.

Details of foaming the latex, applying it, drying it, crushing it and curing it are also described in the '341 patent and need not be discussed in detail. It should be noted, however, that the steps of crushing and curing the foam are not carried out in the practice of the preferred embodiment of the invention until the foam has been joined to the decorated film. One of the reasons for crushing the foam is to make the laminate flexible and to give it a fabric-like hand. Typically, the foam is crushed to less than 25% of its uncrushed thickness. However, it is not crushed completely, so it is also possible to emboss the laminate to give it any of a desired number of textures.

Once the proper substrate is selected after an end-use is established, the next step is to coat the substrate with a crushed acrylic foam. In the past, laminates have been made with and without foam interlayers, and rather than going into some of their short-comings and difficulties, the preferred method in this invention is the use of crushed acrylic foam. Since acrylic crushed foam is in itself an adhesive, no extraneous adhesive is needed. Properly formulated, the crushed acrylic foam consists of a 100% acrylic emulsion vehicle plus a foam stabilizer, cross-linking agent, and other chemical ingredients. When carefully blended to ensure complete dispersion, this acrylic based compound is pumped into a special foaming machine (Oakes Mixer). There it is whipped to the density of egg whites or aerosol shaving cream and forced to the head of a coating machine through a hose and applied to the surface of the substrate. At this point, there should be a good holdout. The foam should not soak into the fibers of the fabric if that be the substrate, but should remain on the surface as a distinct layer. This then is dried in an oven without cross-linking. At this point, the foam may be white or pigmented compositions may be used, and solid color or design may be printed upon the foam utilizing gravure or rotary offset. Fast drying colors with minimum amount of plasticizers should be used to prevent migration of colors and a later undesirable separation of the film from the foam after bonding. Fire retardants such as aluminum trihydrate can be applied to the foam, however, it has been said to be advisable when using aluminum trihydrate, that the foam is dryed and not wet, while making sure the foam is not fully cured or thermoset.

The use and relative advantages of fire retardant additives upon or admixed with furniture fabrics, for example, is discussed in Modern Plastics (pp. 58–59, February 1980). Metallic (aluminum, antimony and others) and halogenated compounds are noted as available in forms suitable for compounding in liquid systems and spraying, including spray-dried powder. The leading fire retardants appear to be $AO_2$ (antimony oxide) and alumina trihydrate (ATH). Bromenated and chlorinated flame retardants are also being marketed with specific emphasis for use with foams.

Up to this point, we have a laminate which has a substrate upon which is a preferably acrylic dried foam layer, which may or may not be crushed, or partially crushed, and which are self-bonding or self-adhered. The foam may or may not necessarily be pigmented, tinted or printed. This foam, however, is dry, but not thermoset or cured.

The next step deals with the application to the foam of the acrylic film which is clear, printed or colored. However, at this point, it should be noted that acrylic crushed foam used in conjunction with acrylic film is the preferred method of embodiment because they are compatible in cross-linking and thermosetting, making it unnecessary to use adhesives, thereby substantially reducing the number of operations and hazards to achieve the product of this invention.

However, the film that is used can be any material that will adhere to the foam, but for ease of manufacture, the film should be self-bonding or self-adhering to the foam. Numerous examples of suitable film and foam combinations will be readily apparent to those skilled in the art. Again, preferably, the film and the foam should be made from acrylic emulsions for another reason; that is, they possess a certain fire retardancy capability of their own, and when burning, do not give off cyanide gas as in the case with fibers of vinyl or urethane composition.

The acrylic film is now applied to the foam for the final bonding, thermosetting, crushing and, if desired, embossing. It is important to say that acrylic foam and film behave well when they are fresh. Like many other things, they have a "shelf life" and should be used as soon as possible. Stored for a considerable length of time, they can become stale and, therefore, useless, or create problems in the final bonding. Also, the two should be produced fairly close even, if possible, under one roof. If one has to be shipped considerable distances, the climatic conditions encountered, such as heat, cold, humidity, can have an effect either on the film or foam, which would cause negative results in processing.

One of the better methods of producing film is to use release paper, because when casting of the film on the release paper, it is in a carefully controlled state from its beginning until its final bonding and thermosetting to the foam. It has a stability which allows it to be colored or printed by highly sophisticated computerized photogravure, rotary and flat bed offset machines, which impart high fidelity colors and prints, which in turn can render photographic effects and textures which other conventional printing machines cannot. Also, finely engraved plates can print designs and solid colors with fast drying plastic colors on either foam or film in such a way that the likelihood of the film later separating from the foam is negligible. Even though this invention covers pigmentation or tinting of either film or foam, the least expensive method is to print the surface of the cast dried film on release paper, to achieve a solid color, or reverse print the design image, and then apply this printed side onto the dried acrylic foam which is preferably pigmented white. When the final crushing and thermosetting takes place and the paper is removed, one can now see a beautiful color, or a beautiful color with many shadings and tone and effects. On the other hand, with this type of printing and embossing, either from the release paper or metal rollers, very realistic dimensional leather effects are achieved, such as alligator, reptile, etc. and the film can be made up with dull matte finish to give expensive leather look or with high gloss to give patent leather look. Also, the film, if necessary, can be perforated by mechanically puncturing the film, or mechanically foaming the latex or applying enzymes before casting, leaving pores in the film allowing it to breathe. Also, the release paper properly engineered would allow its silicone finish to come off, thus imparting a good water repellency and stain resistant finish.

Camouflage prints may be embodied in the film by photographing a pre-selected terrain in color and subsequently transferring the resultant colored image to the film, as for example, by gravure printing or offset printing. The printed laminate with the camouflage image therein may then be fabricated into camouflage garments such as lightweight jackets or other articles of apparel or accessories therefor. The print in the laminate will mirror the terrain from which it was derived.

In the case of garments, the foam acts as an insulator and is desirable.

Decoration, whether on the film or foam, is preferably provided by designs executed in printing inks. To prevent migrating of colors of these designs, the amount of plasticizer in the film and foam should be held to a minimum. At present, it appears that 1 to 2% of plasticizer in the foam does not cause noticeable migration in the design.

The film, which can be multi-layer and cast with other films such as saran, is the protective skin layer. Spraying or roller coating has been employed, but does not equal up in performance, esthetic appeal, washing, dry cleaning, abrasion, etc. as the pre-formed method of preparing film. Also, the film can be applied to the foam on continuous rolls, or can be applied in sheet form using a Sheridan flat bed press.

It is to be noted that it is also possible to make acrylic films by hand using transfer emulsions such as DECAL-IT and HYPLAR which are available in art stores.

Further particulars concerning the technology of making the foam and sandwiching it between the substrate and the clear film are disclosed in the patent to Hoey, U.S. Pat. No. Re. 28,682, which is incorporated herein by reference and thereby made part hereof.

For mass production, designs may be printed on a roll of acrylic film, as previously discussed. This roll, and a similar size roll of foam-backed fabric, are then fed together with the printed side of the acrylic film contacting the foam side of the foam-backed fabric. The film and foam-backed fabric are bonded together by passing them through a pair of heated rollers that are spaced close enough together to crush the foam the desired amount. If it is desired to emboss the decorative laminate, the roller adjacent the film may be shaped to effect such embossing. The temperature of the heated roller may be such as to cure the film and foam. Typical curing temperatures range from approximately 200 to 400 degrees Fahrenheit. Further curing of the resulting film/foam/fabric decorative laminate may be accomplished by additional heating at appropriate temperatures.

The silicone-release paper may be removed from the film before the film, foam and fabric are finally cured. Preferably, the paper is not removed from the film until the foam is crushed by the rollers. This keeps the surface of the roller adjacent the film from accumulating any of the acrylic film. In addition, by using an embossable release paper instead of plain paper, it is possible to emboss the decorative laminate, without using a specially shaped roller at the same time as the foam is crushed by the rollers. As still another alternative, embossing may be performed as a separate step after the foam is crushed.

The release paper may be retained and rolled with the laminate for stripping by the end user.

Individual designs can be formed by hand by coating a transfer acrylic emulsion onto an inked design on paper. Several such coatings may be necessary to provide a strong enough film. The coatings are first dried and then the emulsion-coated design is soaked in warm water. The paper is then peeled off leaving only the acrylic film into which the inked design has been transferred. This side of the film bearing the ink is then placed in contact with the foam side of the foam-backed fabric and heat and pressure are applied to bond the film and the foam-backed fabric into a unitary film/foam/fabric decorative laminate.

EXAMPLE

In practicing the invention by hand, the acrylic film was prepared by coating a lithograph with a transfer emulsion such as DECAL-it. Several coatings were applied and let dry. The emulsion-coated lithograph was then soaked for several hours in warm water and then dried. The acrylic film which bore the lithographic inks transferred from the lithograph was peeled off the soaked paper. The ink side of the film was then placed in contact with the foam side of a foam-backed substrate. Using hand pressure with a hot electric iron, the film/foam/fabric composite was then bonded together, simultaneously crushing the foam. The crushed foam in the resulting laminate was less than approximately 10 mils thick and the film was on the order of 2 or 3 mils thick. Paterns were embossed in the film/foam/fabric laminate by pressing shaped, solid objects into the laminate. The foam-backed textile fabric used had been crushed and cured in the process of its manufacture.

Nevertheless, the foam may be crushed still more by applying pressure and to effect cross-linking between the film and the foam by applying heat as is evidenced by the fact that the resulting laminate was indeed bonded together.

Figure 1:
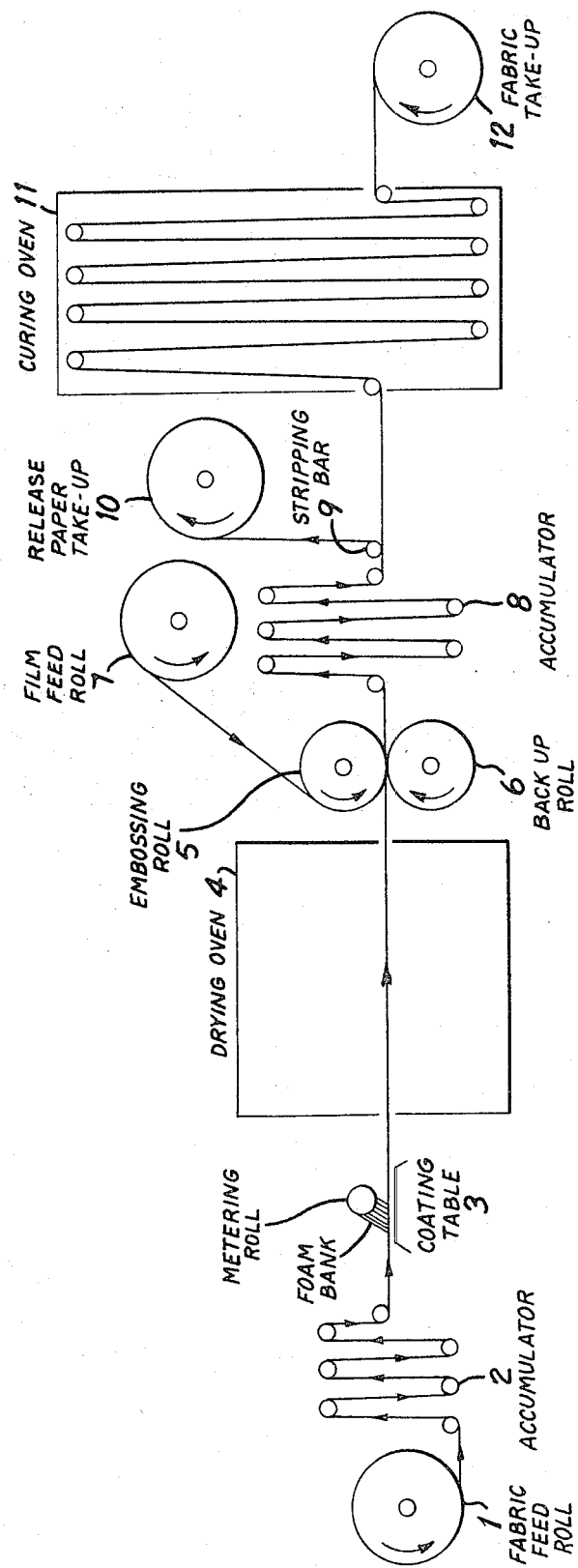
FIG. 1 is a schematic representation of a method of fabricating a laminate according to the present invention which comprises a basic substrate, crushed foam, and a decorated film in that order.

Referring now more particularly to the drawings, FIG. 1 illustrates schematically a general assembly of apparatus or machinery adapted for fabricating the present composite laminate. As there seen, the substrate material may be a continuous length of knitted, woven, non-woven or other relatively flat material 1 which is unwound from a roller rotating in the direction shown by the arrow. As the substrate material 1 is unwound from the roller, it is moved through a plurality of coacting tensioning rollers otherwise identified in the drawing as the accumulator 2. From hence the substrate 1 is moved across or through the foam applicator zone at table 3 where it may be partially crushed. At the same time, and by the same means, additives in the nature of fire retardant or insect repellent compositions, or both, may be applied to, mixed together with, or otherwise incorporated, in the foam. Following the application of the foam with or without the additives, the foamed substrate is passed through an oven dryer 4 and from which it exits to pass through the nip of a pair of rollers 5, 6 where it is subjected to sufficient pressure as to crush the foam. At the same time, the rollers 5, 6 may be heated so as to laminate to the foam a continuous length of decorated film 7 temporarily adhered to a strippable release paper which is unwound in the direction of the arrow so that the decorated film and foamed substrate simultaneously pass through the nip of rollers 5, 6. By such means the film 7 is laminated to the substrate 1 without, however, any substantial curing of the crushed foam component of such laminate. The heat generated at the nip of the rollers 5, 6 is sufficient, however, to partially cure the foam. Roller 5 may be a leather grain embossing roll; and roller 6 a reverse back-up roller.

Following its emergence from the nip of the rollers 5, 6, the substrate 1 with the decorated film 7 and crushed, but partially uncured foam laminated thereto, may be passed through a secondary set of accumulating and tensioning rollers 8 and from thence under a stripping bar 9. At that station, the release paper is stripped from the laminated film and wound up on roller 10. At the same time, the laminated film-foam-substrate is finally cured in the cure box 11. As the cured composite laminate, the final product, comes out of the cure box 11, it is wound up on a roller 12 ready for shipment or storage.

FIG. 1 shows foaming, combining, embossing and curing. Even though not shown, the film casting and, if necessary, needle perforating can be done on the same premises, or the various steps can be done at separate locations. Also, the stripping bar operation can be omitted and done after shipping at the final manufacturing facility.

Figure 2:
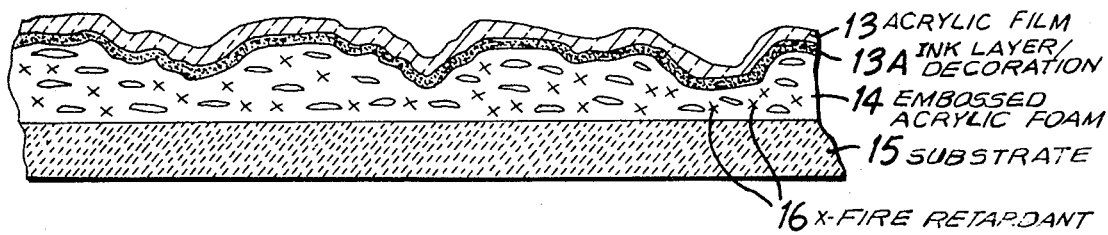
FIG. 2 is a schematic arrangement of the laminated product of the invention wherein a fire retardant composition is embodied or encapsulated within the foam which is sandwiched between the outer film and lower substrate.

FIGS. 2-3-4 illustrate various forms of the present invention all of which comprise the composite article of a film 13 with a decorated underlayer 13A laminated to a foam 14 adherent to an underlying substrate 15.

More particularly, FIG. 2 typifies the addition of a fire retardant composition 16 to the foam 14 interlayer interposed between the film 13 decorated as at 13A and the underlying adherent substrate 15. In FIG. 3, there is shown the addition of an insect repellent composition 17 to the foam interlayer 14 and the film is, therefore, shown as perforated as at P. The film may be perforated mechanically or by other known methods such as foaming the latex before casting, using chemical blowing agents or disolving temporary fibers in the latex before the film is cast to leave pores in the finished surface film.

It is to be understood, of course, that, if desired, the fire retardant composition 16 and the insect repellent composition may both be incorporated in or on the foam layer 14.

FIG. 4 exemplifies that embodiment of the invention which comprises the addition of both the fire retardant composition 16 and the insecticide 17 incorporated in the present laminated article. Moreover, this example also includes the insulator coating 18 underlying the substrate member 15 so that, as seen in FIG. 4, a composite article according to the present invention may comprise the substrate 15 over or undercoated with the insulator 18 layer and with the crushed foam 14 laminated to the top side of the substrate 15 and containing the fire retardant composition 16 and with the top layer of the plastic film 13 undercoated or printed with a decorative layer 13A. Aluminum or copper microns which are vacuum metallized on the far side of the substrate may be used as the insulator layer 18. Also, copper and aluminum foil may be used for rigid insulators. The laminate of FIG. 2 might also preferably incorporate an insulator layer.

As will be appreciated, the embodiment of FIG. 4 of the invention may be modified by eliminating from the composite laminate article the fire retardant composition 16 or the insect repellent 17. It is to be noted also that the perforations P will permit the fire retardant to react with ambient, but that the film still acts as a barrier to a large extent.

The laminate of the invention may be perforated in those end uses which require the laminate to "breathe". While this would affect the effectiveness of the barrier; i.e., the film 13, which protects the fire retardant or insect repellent or other type of active additives, it would not totally diminish the effectiveness of the film as a barrier.

With respect to the fire retardant composition, various chemicals may be employed for such purpose, including the following: boric acid, borax or sodium tetraborate; sodium bichromate; trimethyl boroxine; tris phosphate; bromochloromethane; tetra-bromobisphenol A; tetra-bromophtalic anhydride; ammonium phosphate compounds; potassium aluminum sulphate; potassium bichromate; and the chlorinated napthalenes. The preferred fire retardant compositions are oxide fillers, metallic and hologenated compounds, brominated and chlorinated compounds.

For the insecticide, various compositions may be utilized according to the present invention, but should be chosen from those repellents which are as compatible as possible with uses in clothing worn near the skin of the wearer. Non-flamable repellents are, of course, also preferable. Examples of repellents are: napthalene; p-dichlorobenzene; xylene; chlorinated compounds such as DDT; cupric acetate; Paris Green; cryolite; epichlorohydrin; and mercury compounds.

What is claimed is:
1. A laminate comprising:
   (a) an intermediate layer of cross-linked thermoset resilient foamed emulsion adhered to;
   (b) a substrate
   (c) said intermediate layer (a) being self-bonded to the substrate (b)

(d) at least one active compound added to said intermediate layer;

(e) barrier means for substantially preventing ambient elements and said at least one active compound from reacting, said barrier means comprising a plastic surface film of a cross-linked thermoset emulsion self bonded to said intermediate layer;

(f) whereby, said at least one active compound will react to ambient elements only upon said barrier means being at least partially opened to expose a least a portion of said intermediate layer.

2. The laminate of claim 1, wherein said intermediate layer is crushed foam.

3. The laminate of claim 2, wherein said substrate is a textile fabric.

4. The article of claim 3 in which the surface film has printed thereon a decorative layer between (a) and (b); the article has a fabric-like hand.

5. The article of claim 2, wherein the substrate is a rigid material.

6. The laminate of claim 2 further characterized in that said compound is a fire retardant.

7. The laminate of claim 2 further characterized in said compound is an insect repellent.

8. The laminate of claim 2 further characterized in that the substrate comprises an outer insulator.

9. The laminate of claim 6, wherein the fire retardant is a metallic compound.

10. The laminate of claim 6 in which the fire retardant is a hologenated compound.

11. The laminate of claim 6 in which the fire retardant is a bromenated compound.

12. The laminate of claim 6 in which the fire retardant is a chlorinated compound.

13. The laminate of claim 2 further characterized in that an insect repellent is embodied in the film.

14. The laminate of claim 7, wherein the insect repellent is a mercury compound.

15. The laminate of claim 7, wherein the insect repellent is napthalene.

16. The laminate of claim 7 in which the insect repellent is a chlorinated compound.

17. The laminate of claim 16 in which the chlorinated compound is DDT.

18. The laminate of claim 8 wherein the insulator is aluminum foil.

19. The laminate of claim 8 in which the insulator is a polyester film.

20. The laminate of claim 8, wherein the insulator is vacuum metallized on the substrate.

21. The laminate of claim 8 in which the substrate is vacuum metallized with aluminum.

22. The laminate of claim 8 in which the substrate is vacuum metallized with copper.

23. The laminate of claim 6 in which the fire retardant is an oxide filler.

24. The laminate of claim 1, wherein said laminate is perforated.

25. The laminate of claim 13, wherein said laminate is perforated.

26. The laminate of claim 7, wherein said laminate is perforated.

27. The laminate of claim 7, wherein said laminate is perforated and insect repellent is applied to the outer face of the film.

* * * * *